United States Patent [19]

Pendleton

[11] Patent Number: 4,944,494
[45] Date of Patent: Jul. 31, 1990

[54] FENCE STRUCTURE

[76] Inventor: Robert J. Pendleton, 6465 Edgewood, Brighton, Mich.

[21] Appl. No.: 410,812

[22] Filed: Sep. 22, 1989

[51] Int. Cl.⁵ .............................................. E04H 17/14
[52] U.S. Cl. ....................................... 256/68; 256/54; 403/398; 248/66
[58] Field of Search ............... 256/65, 68, 69, DIG. 4, 256/54; 403/386, 398; 248/74.5, 74.2, 74.1, 66, 71, 65

[56] References Cited

U.S. PATENT DOCUMENTS

| | | | |
|---|---|---|---|
| 186,153 | 1/1877 | Nellis | 256/59 |
| 1,462,671 | 7/1923 | Vrba | 248/71 |
| 3,199,816 | 8/1965 | Weisz | 248/71 |
| 4,208,038 | 6/1980 | Reid | 256/65 |

Primary Examiner—Andrew V. Kundrat
Attorney, Agent, or Firm—Bertram F. Claeboe

[57] ABSTRACT

A fence structure is provided for the containment of horses and the like, employing in combination with wooden vertical posts a plurality of vertically spaced and generally parallel disposed horizontal metal rails fixedly secured to the wooden posts by readily attachable support means, preferably provided by clamp means substantially encircling each of said metal rails and maintained therearound by fastening means in intimate engagement with the wooden posts. In a specific exemplary embodiment of the invention, the support means may take the form of brace bands in combination with pole barn nails.

1 Claim, 1 Drawing Sheet

U.S. Patent  Jul. 31, 1990  4,944,494
FIG. 1
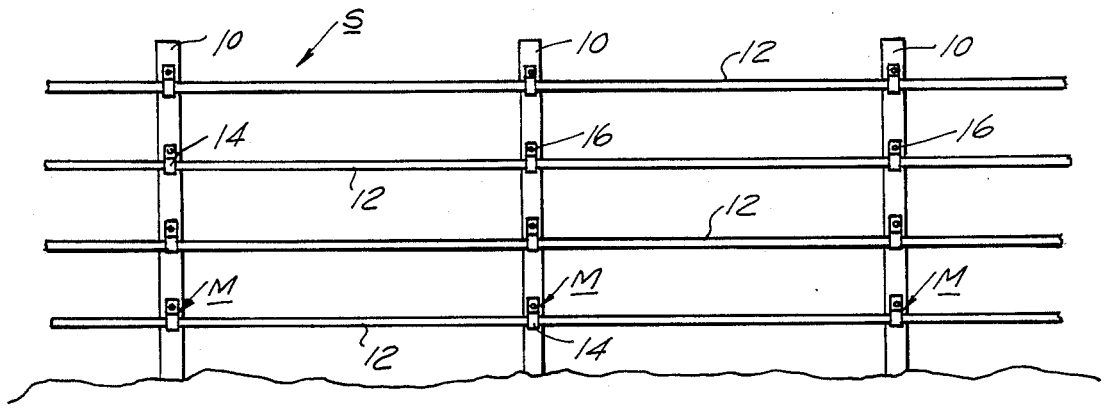
FIG. 2
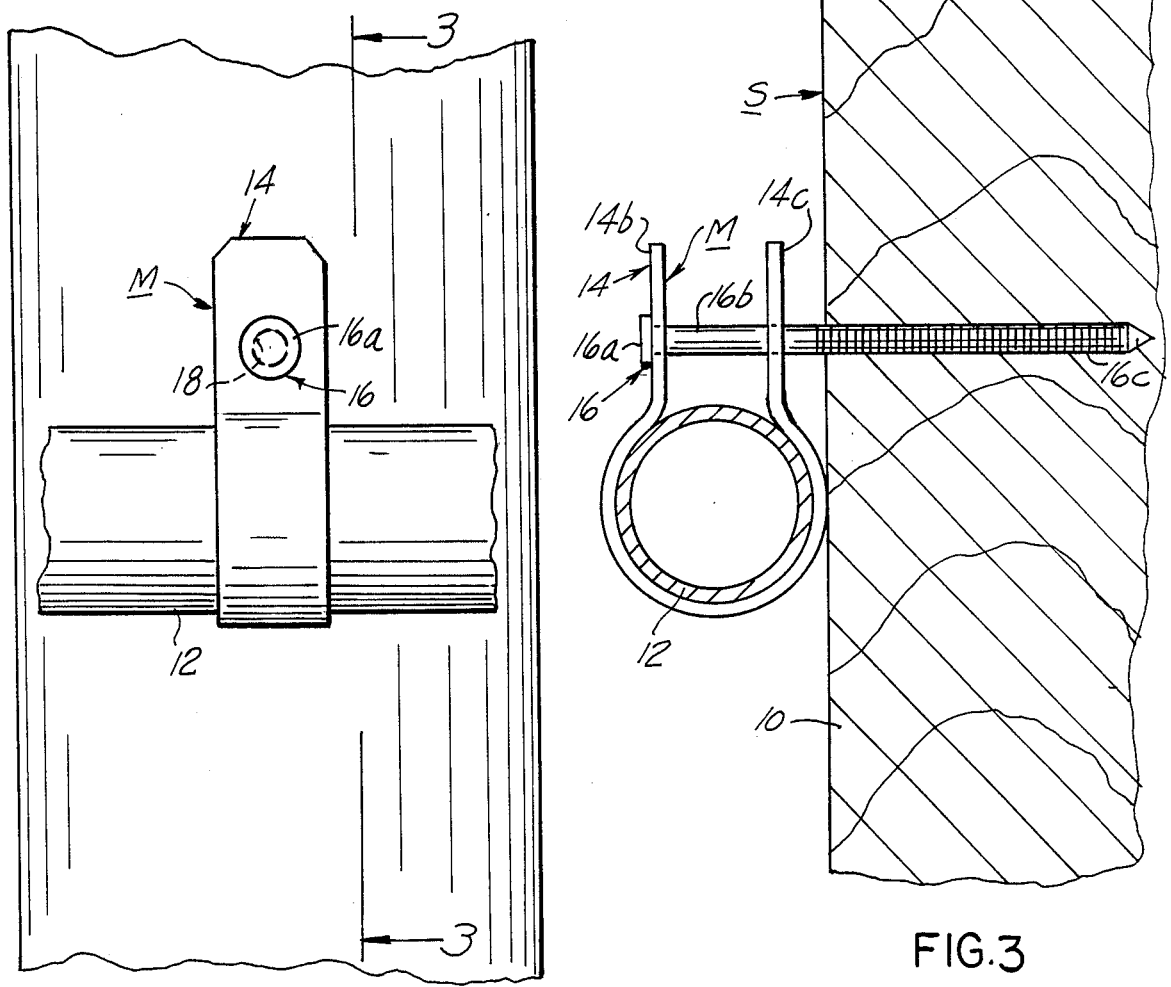
FIG. 3

FENCE STRUCTURE

BACKGROUND OF THE INVENTION

It is known in the art to which this invention pertains to provide fencing as a barrier to prevent the escape or intrusion of animals exemplified by horses. A conventional construction for this purpose is generally constructed substantially entirely of wood, ostensibly for relative ease of construction and maintenance. However, horses are characteristically spirited animals, and in their escape attempts, may not only cause serious injuries to themselves from wooden rail fence breakage, but fence repair expenses resulting therefrom can often be substantial.

A further characteristic of horses is their propensity for chewing wooden fences, and particularly the horizontal rail portion thereof. This necessarily increases repair expenses associated with the prior art structures.

SUMMARY OF THE INVENTION

Applicant's contribution to fence constructions is directed principally to the provision of connecting horizontal rail sections fabricated of metal, and the further provision of novel means for expeditiously securing the horizontal rails to conventional vertical wood posts. The horizontal rail sections are preferably formed at opposite ends so as to be telescopic, and the securing means desirably comprises clamping means in the form of brace bands and nail means which may be of the variety referred to as pole barn nails.

In fabrication of the fencing system of this invention, the brace bands are positioned in encircling relation with the horizontal rail sections, and with the tongue or flange portion of each band directed upwardly, a nail is driven through each hole in the brace band and into the vertical wood post. Means in substitution for brace bands and pole barn nails will become apparent as the description now proceeds.

BRIEF DESCRIPTION OF THE DRAWINGS

FIG. 1 is a front elevational view of fence structure constructed in accordance with the novel concepts of this invention;

FIG. 2 is a fragmentary detail view thereof; and

FIG. 3 is a vertical sectional view taken substantially along the line 3—3 of FIG. 2.

DESCRIPTION OF THE PREFERRED EMBODIMENT

Referring now to the drawings, and first to FIG. 1 thereof, a cost effective fence structure as provided by this invention is generally designated by the legend S. The structure S comprises a plurality of vertical posts 10 conventionally constructed of a durable or weather-resistant wood such as cedar, and normally with a diametral thickness of about three to four inches. The posts 10 are generally horizontally spaced approximately ten feet, and if desired, may be set in a concrete base.

In substitution for the prior art wooden horizontal rails, which are possessed of the disadvantageous characteristics hereinabove noted, applicant has provided a plurality of connecting horizontal tubular rails 12 constructed of a high strength and relatively low cost metal such as iron, steel, or aluminum or alloys thereof. The tubular horizontal rails 12 generally have an outer diameter of approximately 1½ to 2½ inches, and at their opposite ends may be threadably associated, or may be formed for telescopic engagement. Welded joints are also an alternative.

Means for rapidly and effectively securing the metal horizontal rail members 12 to the wooden vertical posts 10, and maintaining the members 12 in the generally parallel relation of FIG. 1, are shown in detail in FIGS. 2 and 3. The support or attaching means are generally designated by the legend M, and comprise clamp means 14 and cooperating fastening means 16.

The clamp means 14 of this invention may be provided by a device termed in the art as a "brace band", and is shaped to include a generally semi-circular body portion 14a and integral outwardly extending flange or tongue portions 14b and 14c disposed in generally parallel relation as shown in FIG. 3. Each flange portion 14b and 14c is apertured as at 18, and the aligned holes so provided may be circular or square to more effectively accommodate fastening means 16. The clamp means are preferably formed of iron or steel materials, although high strength plastics may also be employed.

The fastening means 16 in work performed to date may desirably be provided by the product termed "pole barn nails", and a form suitable for practice of the present invention is a 4 inch tempered steel variety. As is known, with fastening means 16 of this type the nail is formed with a head portion 16a, rounded or square shank portion 16b, and configured gripping portion 16c. The gripping portion 16c may be contoured in a relatively fine or shallow spiral pattern as shown, in a more coarse or deeper grooved spiral, or in any other manner now apparent to those skilled in the art.

The novel concepts of this invention may be practiced at competitive costs in connection with the repair and reconstruction of an existing all-wood fence arrangement, or in the production of a totally new fence installation. The wood posts 10 formed of cedar or like construction-type trees are set in the ground with or without a concrete base, spaced generally about 10 feet from one another. The horizontal rails 12 of tubular steel or aluminum alloy stock are conveniently employed in approximate 21 foot lengths, and one end thereof is preferably slightly flared to provide a telescopic connection upon assembly. Of course, in the alternative, opposed ends of the rails 12 may be externally threaded, and an internally threaded sleeve employed to effect the joinder. Welded joints may also be provided as as alternative.

Clamp means 14, preferably of the type known in the art as a brace band, is then passed over one end of a metal horizontal rail 12, and with the flange portions 14b and 14c directed upwardly, fastening means 16 are driven into the wooden vertical post 10 to a depth of at least three inches. It is to be noted from FIG. 3 that when the assembly is completed, there is surface to surface contact between the rail 12 and clamp means 16 substantially entirely thereabout. The clamp means 16 is, in effect, a "stirrup" for the metal rail 12, thereby enhancing the overall strength of the fence structure S.

It is within the contemplation of this invention that were the vertical posts constructed of metal, such as steel, rather than wood as herein described, the fastening means in that event could take the form of bolt means. Additionally, the horizontal rails may be square in cross-section rather than round, and accordingly, the configuration of the clamp means would be suitably modified.

By this invention injury to horses from collision with wood horizontal rail fence structures is substantially eliminated, and as well, damage to the wooden horizontal rails by horses chewing theron is totally overcome. While the principal environment for the present invention is on horse farms, it also has application to corrals, in stockyards, and other locations.

Various changes and modifications to the invention have been noted herein, and these and other variations may, of course, be practiced without departing from the spirit of said invention or the scope of the subjoined claims.

I claim:

1. A fence structure for containing horses and the like, comprising a plurality of vertical wooden posts, a plurality of horizontal metal rails disposed in parallel relation upon said posts, clamp means engageable with each of said rails, each of said clamp means including a generally semi-circular body portion and a pair of smooth-surfaced apertured flange portions extending outwardly and upwardly therefrom in spaced relation to one another and to said vertical posts, and nail means received in the aperture in each of said flange portions and grippingly engageable with said vertical wooden posts in substantial penetration thereinto.

* * * * *